(12) United States Patent
Wakelin et al.

(10) Patent No.: US 6,339,506 B1
(45) Date of Patent: Jan. 15, 2002

(54) MICROLENS ARRAY WITH SPATIALLY VARYING OPTICAL PROPERTY

(75) Inventors: Suzanne Wakelin, Mountain View; Matthew W. Derstine, Sunnyvale; James S. Wong, Mountain View, all of CA (US)

(73) Assignee: ONI Systems Corp., San Jose, CA (US)

( * ) Notice: Subject to any disclaimer, the term of this patent is extended or adjusted under 35 U.S.C. 154(b) by 0 days.

(21) Appl. No.: 09/432,293

(22) Filed: Nov. 2, 1999

Related U.S. Application Data
(60) Provisional application No. 60/107,393, filed on Nov. 6, 1998.

(51) Int. Cl.[7] .............................. G02B 3/00; G02B 27/10
(52) U.S. Cl. ........................................ 359/648; 359/626
(58) Field of Search ................................ 359/619, 626, 359/721, 724, 648; 348/340; 264/1.32, 25; 425/808

(56) References Cited

U.S. PATENT DOCUMENTS

| | | | |
|---|---|---|---|
| 5,439,621 A | * 8/1995 | Hoopman | 264/2.5 |
| 5,594,752 A | 1/1997 | Endriz | 372/50 |
| 5,787,107 A | 7/1998 | Leger et al. | 372/71 |
| 5,793,520 A | 8/1998 | Stace et al. | 359/320 |

FOREIGN PATENT DOCUMENTS

| | | | |
|---|---|---|---|
| WO | WO 97/34171 | 9/1997 | G02B/21/06 |

* cited by examiner

*Primary Examiner*—Georgia Epps
*Assistant Examiner*—David N. Spector
(74) *Attorney, Agent, or Firm*—Townsend and Townsend and Crew LLP

(57) ABSTRACT

Optical systems are corrected for a variety of aberrations by a microlens array where an optical property of the individual microlenses varies as a function of position in the array. For example, the microlenses can be configured so that the focal length varies to correct field curvature. Representative environments for the microlens array may be characterized by a pixellated source (array of individual sources) in an object plane or a pixellated detector (array of individual detectors) in an image plane, or both.

5 Claims, 6 Drawing Sheets

MICROLENS ARRAY WITH SPATIALLY VARYING OPTICAL PROPERTY

CROSS-REFERENCES TO RELATED APPLICATIONS

This application claims priority from U.S. patent application Ser. No. 60/107,393, filed Nov. 6, 1998, titled "Microlens Array with Spatially Varying Optical Property," the entire disclosure of which (including all attached documents) is incorporated by reference in its entirety for all purposes.

This application also incorporates the entire disclosure (including all attached documents) of U.S. patent application Ser. No. 60/107,292, filed Nov. 6, 1998, titled "Optical Interconnect Using Microlens/Minilens Relay" by reference in its entirety for all purposes.

This application is being filed concurrently with the following U.S. patent application, the entire disclosure of which is incorporated by reference in its entirety for all purposes: Ser. No. 09/432,892, filed Nov. 2, 1999, titled "Optical Interconnect Using Microlens/Minilens Relay".

STATEMENT AS TO RIGHTS TO INVENTIONS MADE UNDER FEDERALLY SPONSORED RESEARCH AND DEVELOPMENT

The U.S. Government has rights to this invention pursuant to Contract No. F30602-98-C-0149, awarded by the U.S. Air Force.

BACKGROUND OF THE INVENTION

The present invention relates generally to lens systems, and more specifically to techniques for correcting aberrations such as field curvature.

The presence of a considerable amount of field (Petzval) curvature is a relatively basic feature of most refractive lens systems. However there are certain applications where a flat field is important, including camera objectives and some relay optics. Unfortunately, field curvature is one of the hardest aberrations to correct, requiring increases in the complexity of the lens far in excess of those required to correct spherical and chromatic aberrations. Other aberrations such as astigmatism are also a function of the field position and may be difficult to correct in the presence of other constraints to the lens design.

SUMMARY OF THE INVENTION

The present invention provides a powerful and cost-effective technique for correcting optical systems for a variety of aberrations, or for otherwise controlling the imaging properties of the optical system.

In short, the invention uses a microlens array where an optical property of the individual microlenses varies as a function of position in the array. A primary example is where the microlenses are configured so that the focal length varies to correct field curvature. More specifically, in a two-dimensional array, the focal lengths of the microlenses vary as a function of distance from the center of the array. Typically, the focal length would be smallest near the center and increase with distance from the center, but the converse could be true if it was desired to increase the field curvature for some special purpose.

Representative environments for a microlens array according to the invention may be characterized by a pixellated source (array of individual sources) in an object plane or a pixellated detector (array of individual detectors) in an image plane, or both. In this context, the individual sources or detectors could be the ends of optical fibers.

The invention can also be used to correct other aberrations such as astigmatism by configuring the spatial variation appropriately. While the focal length is one microlens property that can be spatially varied, the shape can also be varied, for example by a departure from a spherical surface contour.

A further understanding of the nature and advantages of the present invention may be realized by reference to the remaining portions of the specification and the drawings.

DESCRIPTION OF SPECIFIC EMBODIMENTS

Introduction

The present invention provides a microlens array where an optical property of the individual microlenses varies as a function of position in the array. In the embodiments described in detail below, the optical property is the focal length. Further, a spatial variation of the focal length is implemented to correct field (Petzval) curvature present in other elements of the optical system within the microlens array is deployed.

A microlens array according to the invention finds particular utility in systems with pixellated sources or detectors, and its use relaxes design constraints on other elements in the system. The first application described below is a relay system for coupling light from one array of points to another, and more specifically for use in a high speed interconnect. Typically, one array will be a plurality of light sources and the other a corresponding plurality of light detectors. The sources can be the ends of output fibers and the detectors the ends of input fibers. One application contemplates that the sources will be driven by a plurality of electrical signals on one board or module, and the detectors will provide a corresponding plurality of electrical signals on another board or module. In the particular environments, the microlens array cooperates with a pair of minilens arrays.

General Optical Configuration

Figure 1:
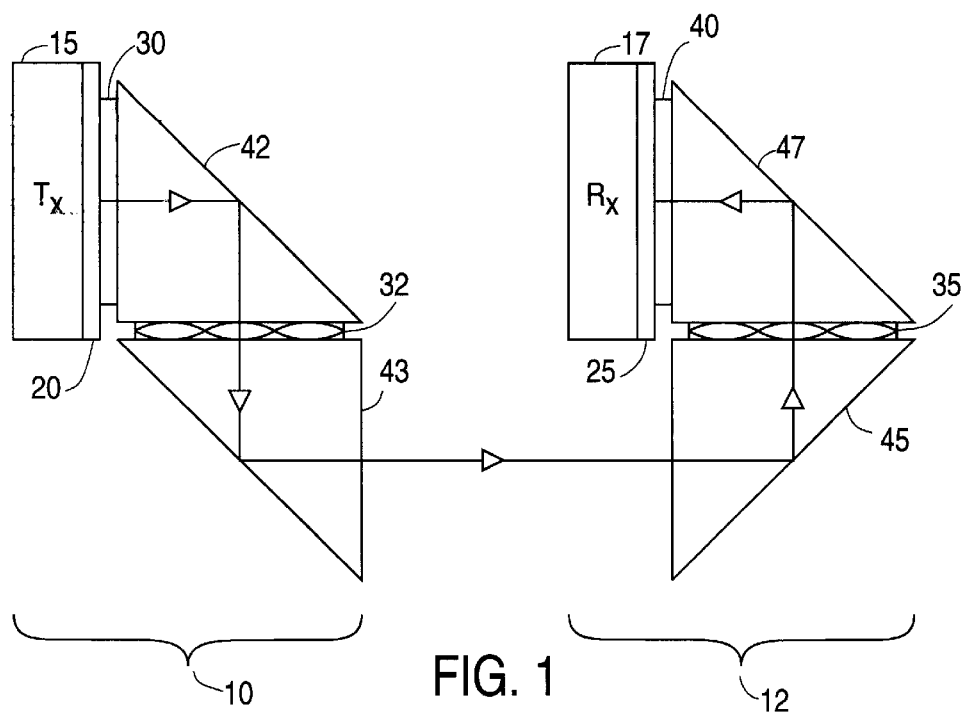
FIG. 1 is a simplified side view showing communication between a transmitter module and a receiver module using an optical interconnection that includes a microlens array having a spatially varying focal length according to an embodiment of the invention.

FIG. 1 is a simplified side view showing communication between first and second modules 10 and 12 using an optical interconnection that includes microlens arrays according to an embodiment of the invention. The optical interconnection is partitioned between the two modules. Module 10 includes an electrical transmitter block 15 and the first half of the optical interconnection. Module 12 includes an electrical receiver block 17 and the second half of the optical interconnection. Transmitter block 15 provides a plurality of electrical signals, which are to be communicated to receiver block 17. The figure arbitrarily shows the communication from left to right. As a matter of terminology, it is convenient to define upstream and downstream directions. In the figure, module 10 can be considered to be upstream of module 12, whereupon the transmission sent to module 12 is considered a downstream transmission.

Blocks 15 and 17 are shown schematically, and could represent circuitry, or electrical connectors to other circuitry (not shown). Transmitter block 15 interfaces to the optical interconnection via an array 20 of electrical-to-optical conversion (E/O) devices, while receiver block 17 interfaces to the optical interconnection via an array 25 of optical-to-electrical conversion (O/E) devices. For convenience, arrays 20 and 25 will be referred to as the source and detector arrays. In fact, these arrays could be defined by the ends of optical fibers.

The optical elements in the first half of the interconnection include a first microlens array 30 and a first minilens array 32; those in the second half include a second minilens array 35, and an optional second microlens array 40. The embodiment shown in FIG. 1 uses a folded optical path, provided by prisms 42 and 43 on the first module, and 45 and 47 on the second module. This folded configuration has the property that the transmitter and receiver blocks can face in the same direction. A single line shows the general nature of the folded path, although the actual optical paths are more complicated, as will be described below. As mentioned above and as will be described in detail below, one aspect of the invention provides that the focal length of the microlenses vary radially across the array's clear aperture to correct for field curvature of the minilenses.

Figure 2:
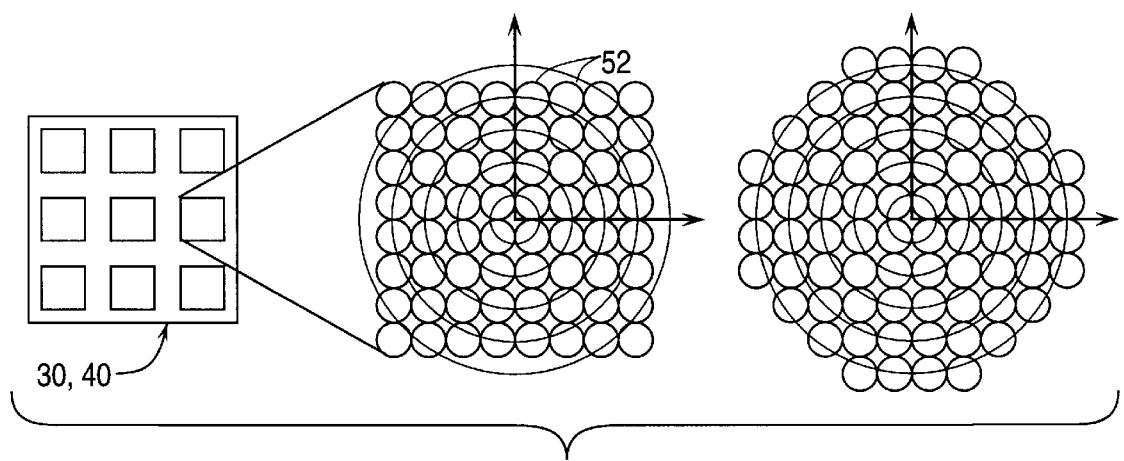
FIG. 2 is a plan view of one of the microlens arrays, including an enlarged detail portion of one of the microlens sub-arrays.

FIG. 2 is a plan view of one of the microlens arrays (30 or 40). In a preferred embodiment, the microlens array includes a plurality of spatially separated sub-arrays, referred to as clusters 50 (or patches). The figure also includes an enlarged view of one of the clusters, showing the individual microlens elements 52. The source and detector arrays are arranged in corresponding clusters so that the individual microlenses in array 30 are registered to respective devices in source array 20, and the individual microlenses in array 40 are registered to respective devices in detector array 25. For example, 576 sources could be arranged in 9 clusters, perhaps arranged in a 3×3 array as in the figure, with an 8×8 array of sources in each cluster. Other possibilities abound, depending on the needs of the system.

It is possible to increase the spatial density of sources and detectors by having a close-packed hexagonal configuration. Alternatively, the sources, detectors, and microlenses could still be on a square pitch, but the clusters could be bounded by an octagon rather than a square to allow more microlenses per cluster. This is shown in the rightmost portion of FIG. 2. An advantage of putting the elements in an octagonal array is to improve the interconnect density by using the minilens in a more radially uniform manner than with a square array.

The figure shows the cluster of microlenses overlaid with a set of concentric circles. These circles represent different distances from the center of the array. Since the microlenses are shown on a square pitch (grid), only four or eight microlenses will be nominally at the same distance from the center. However, it is still possible to configure the microlens focal lengths to exhibit a regular desired dependence on distance from the center of the array.

Figure 3:
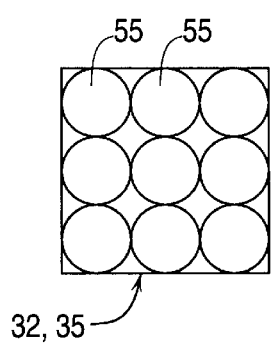
FIG. 3 is a plan view of one of the minilens arrays.

FIG. 3 is a plan view of one of the minilens arrays (32 or 35). As can be seen the minilens array includes individual minilenses 55, arranged so that each minilens registers with a respective microlens cluster. The geometry and relative dimensions and spacing are such that each minilens intercepts the light from all the microlenses in the corresponding cluster. The microlenses, microlens clusters, and minilenses are shown as square arrays disposed on a square pitch.

Overall Optical Operation

Figure 4:
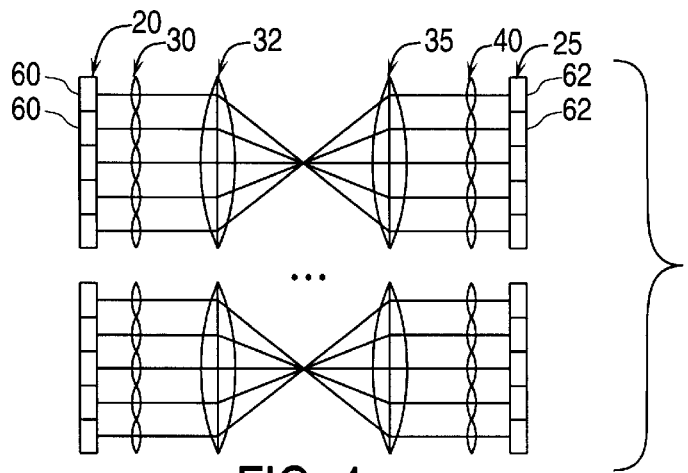
FIG. 4 is an optical schematic showing the transfer between a source array and a detector array.

FIG. 4 is an optical schematic showing the optical transfer between a portion of source array 20 and a portion of detector array 25. The figure shows only the axial ray from the center of each source, and the optical path is shown unfolded. The source array includes individual sources 60; the detector array includes individual detectors 62. Each cluster in microlens array 30, along with its respective minilens in minilens array 32, cooperates with the corresponding minilens in minilens array 35 and its associated cluster in microlens array 40 to provide the interconnection between a cluster of sources and a respective cluster of detectors. The optics are preferably doubly telecentric, which makes the system more tolerant to misalignment. The figure is not to scale; the doubly telecentric relay is four times the focal length of the minilens, less an amount from the focusing effect of the microlenses.

Figure 5:
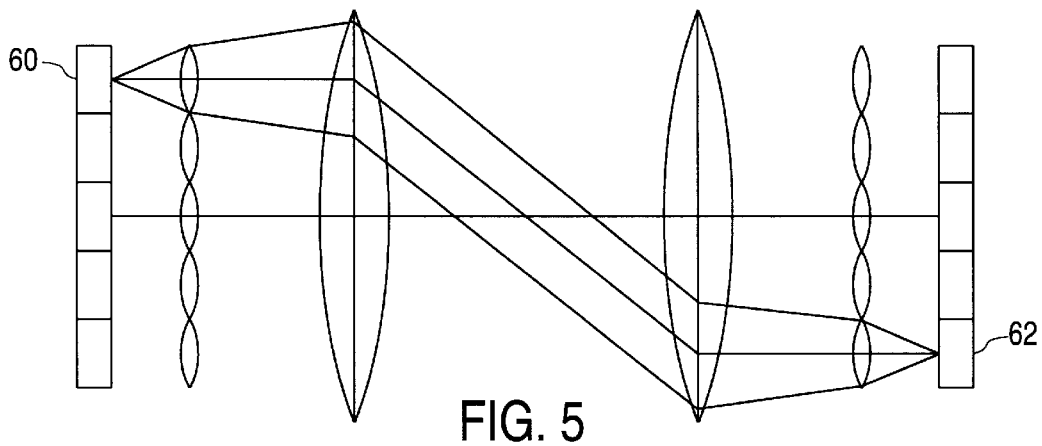
FIG. 5 is shows schematically the rays between a particular individual source in one cluster to the corresponding individual detector in the corresponding cluster.

FIG. 5 shows schematically the rays between a particular individual source 60 in one cluster to the corresponding individual detector 62 in the corresponding cluster. The source is generally very small (with the light coming from an aperture of perhaps a few $\mu$m), and is thus characterized by a significant divergence angle caused by diffraction. The microlens operates to reduce the divergence angle. Because the divergence angle of the light is reduced, a lens can be used to relay the light from all the sources in a single cluster using the imaging properties of the lens. The light from the source, after passing through the microlens and minilens in the transmitter module, is generally collimated, and is brought to a focus by the minilens and microlens in the receiver module.

The use of second microlens array 40 can sometimes be avoided. Since the capacitance of a detector increases with size, small detectors can operate at higher speeds with less power. If a larger detector is acceptable for a particular implementation, the microlens array can be eliminated. However for high-speed systems, smaller detectors are generally preferred, and therefore it is preferred to have the second microlens array to focus the light from the source to a smaller spot.

The approach of using minilens arrays instead of single large lenses to image clusters of sources onto respective clusters of detectors is advantageous since it allows the use of relatively simple lenses to perform the imaging. By making the lens small enough, a single optical surface has sufficiently small optical aberrations that can be used alone to do the imaging. This is particularly the case using microlens arrays according to the invention. At the same time, the minilens can be made sufficiently large that a significant number (say on the order of 400) of channels can be imaged by this lens. The minilenses can be characterized by a relatively small numerical aperture (large f/number).

As discussed above, the use of minilenses leads to partitioning the array of sources (and the array of detectors) into sub-arrays (clusters or patches). This has the side benefit of easing the fabrication of the sources and detectors, since each cluster of sources can be applied to the CMOS transmitter chip independently, making the need for very large arrays of perfect sources unnecessary.

Extension to Bidirectional Communication and Specific Geometric Implementation

Figure 6:
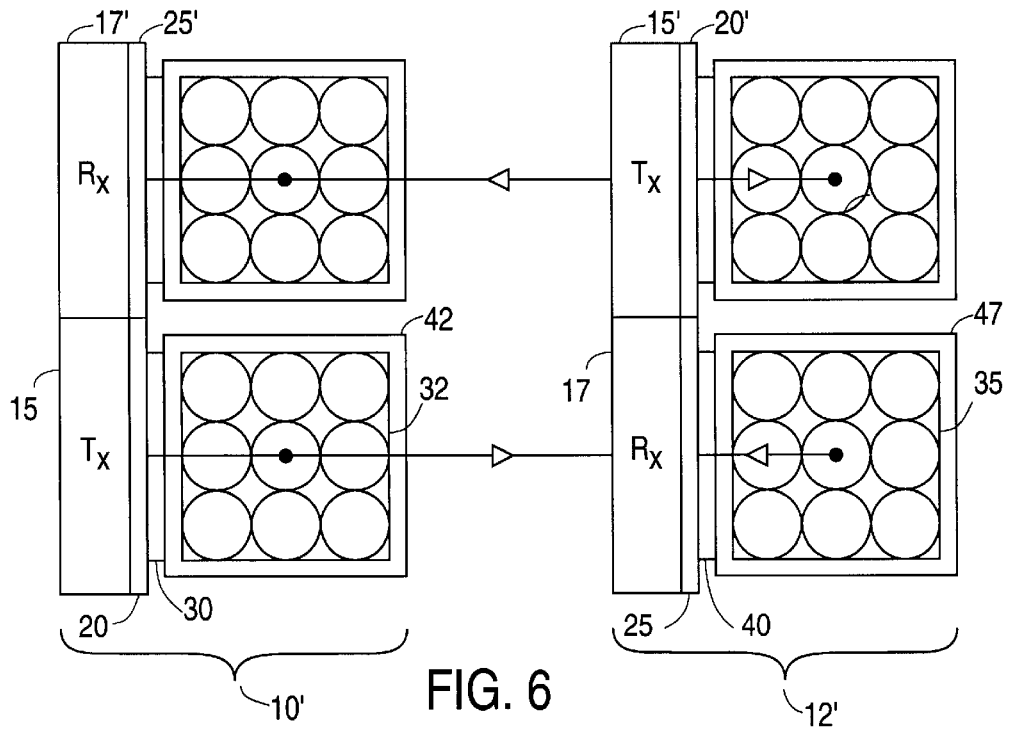
FIG. 6 is a simplified top view showing bidirectional communication between a pair of modules using an the optical interconnection along the lines of the embodiment of FIG. 1.

FIG. 6 is a simplified top view showing how the system of FIG. 1 can be extended to support bidirectional communication between a pair of modules, designated 10' and 12'. The lower half of the figure corresponds to what is shown in FIG. 1, which supports downstream communications. The top half of the figure shows additional elements that are provided to support upstream communications. These additional elements include a receiver block 17' and associated O/E device array 25' provided to module 10', and a transmitter block 15' and associated E/O device array 20' provided to module 12'.

The additional optical interconnect arrays and prisms can be identical to the corresponding arrays and prisms shown in the lower half of the figure. While these additional optical components are shown as separate duplicated items, there is no need for separate components. Rather the microlens arrays, minilens arrays, and prisms that support the downstream communications can be extended as part of the same unitary components to provide support for the upstream communications.

Figure 7:
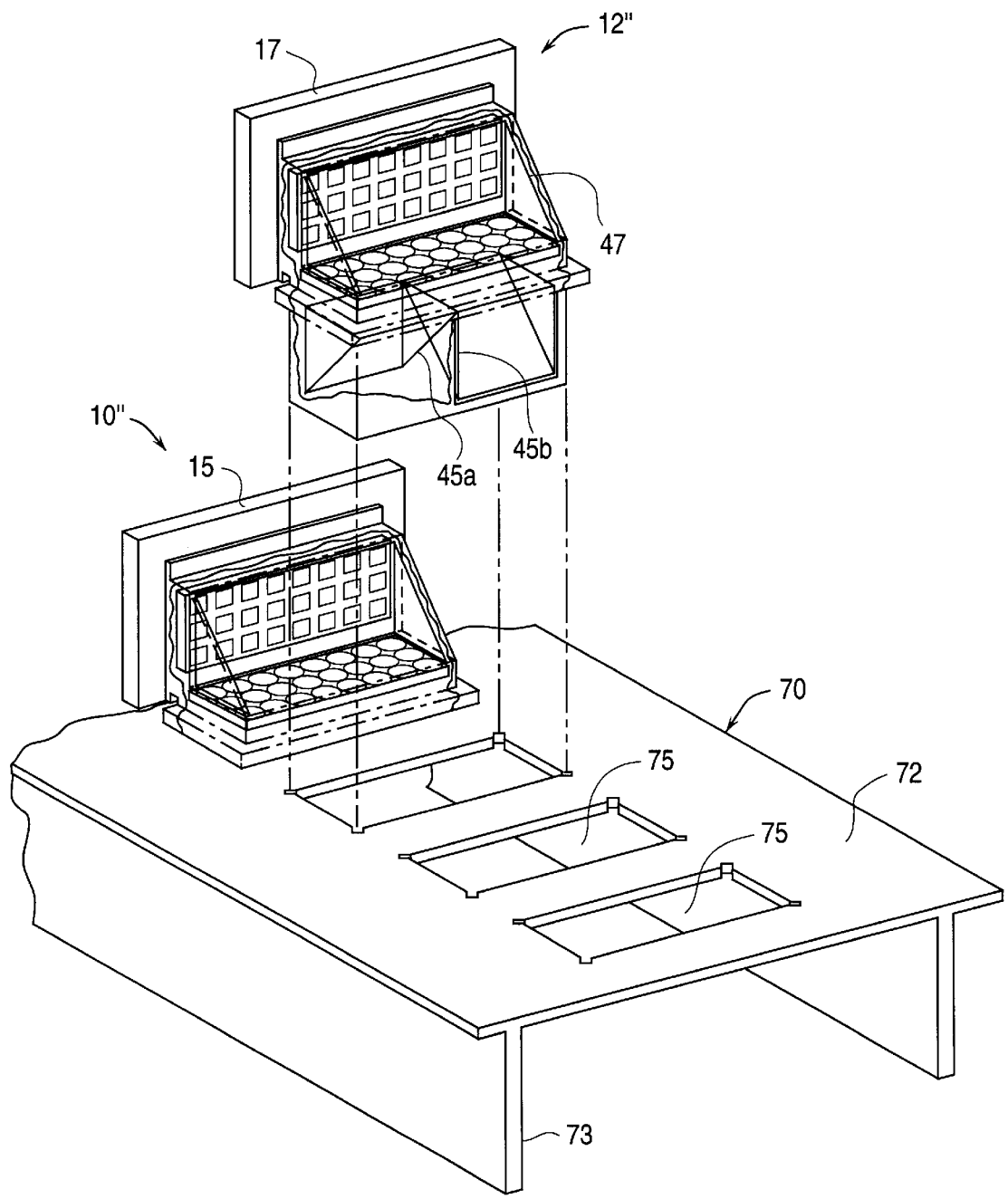
FIG. 7 is a exploded perspective view showing a number of features of a system based on the layout shown in FIG. 1.

FIG. 7 is an exploded perspective view showing a number of features of a system based on the layout shown in FIG. 1. The two modules are designated 10" and 12", and are shown disposed for engagement with a backplane structure 70, which has a baseplate 72. While the system includes elements in addition to those shown in FIG. 1, corresponding reference numerals will be used. Modules 10" and 12" are shown as being configured to be inserted into apertures 75 in backplane baseplate 72. Module 10" is shown inserted into the baseplate while module 12" is above the baseplate prior to insertion.

Module 12" is shown as having two prisms, designated 45a and 45b, which face in opposite directions. Module 10" is correspondingly configured, but the prisms are hidden. The modules are drawn with the case partly cut away, and are shown as having 24 clusters and minilenses each. Thus the left-side 12 clusters of detectors in module 12" can receive signals from module 10" via prism 45a and prism 47, while the right-side 12 clusters of detectors can receive signals from a downstream module (not shown) via prism 45b and prism 47. This is possible because the clustering of the sources and detectors enables mechanical separation between the optical systems in the forward and backward direction.

It is also noted that the figure can be used to illustrate the possibility that the left-side 12 clusters in module 12" could be detectors, as shown in FIG. 1, while the right-side 12 clusters could be sources used to send light to the downstream module (not shown). Further, if half of the left-side clusters in module 10" were sources and the other half detectors, and half of the left-side clusters in module 12" were detectors and the other half sources, prism 45a could be used to support bidirectional communication between modules 10" and 12" along the lines illustrated in FIG. 6.

The ability to construct a system that can be plugged together is facilitated by the microlens/minilens imaging system, which reduces the positional tolerance requirements on the plug-in element. For example, the sources may be arranged in clusters of 8×8 with a separation between elements of 125 $\mu$m. If the source and receiver elements are small (say <10 $\mu$m), than the positioning tolerance of the source and detector could be quite small (perhaps <2 $\mu$m). However, by expanding the beam and mechanically separating the optics into two rigid sections, these sections can be misaligned by as much as 100 $\mu$m or more, large enough that this can be achieved by normal machining methods. The disadvantage of this approach is that reduces the angular tolerances. However, it is still possible to achieve the necessary angular tolerances using normal machining practices.

FIG. 7 also shows that the optical systems can be constructed so that the sources and detectors on different modules are oriented in the same plane. For example, if the sources are 2D arrays of vertical emitting lasers and the receivers are 2D arrays of detectors that are integrated onto a common electronic drive circuit, and this is mounted onto a circuit card, the circuit cards could then be plugged into the mechanical backplane in a fashion similar to electrical backplanes. This feature, combined with the reduced tolerances of the optical system, permits the creation of a blind-mate optical interconnect system.

Alternative Module and Backplane Configurations

Figure 8:
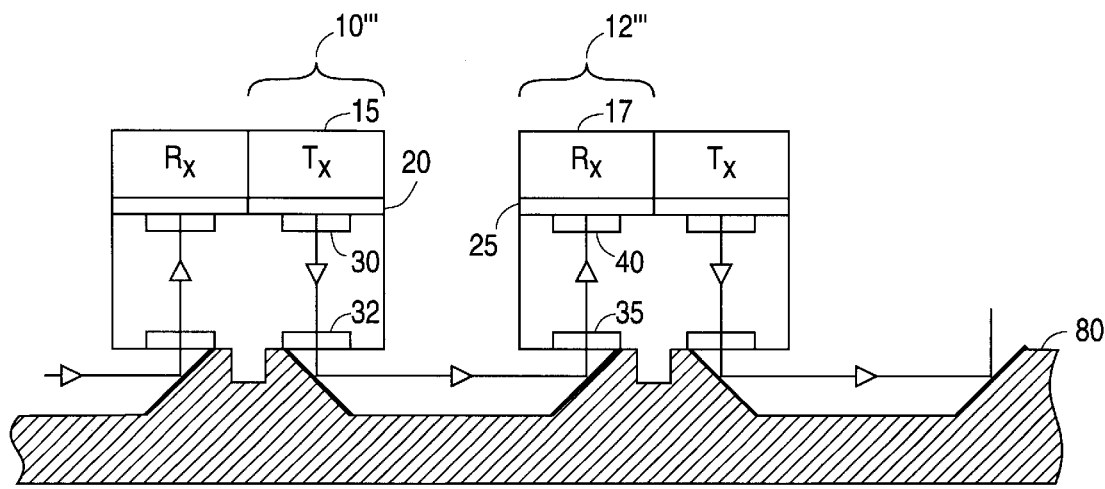
FIG. 8 is a simplified side view showing communication between a transmitter module and a receiver module using an optical interconnection according to an alternative embodiment of the invention.

FIG. 8 is a simplified side view showing microlens arrays according to the invention in a system that provides communication between a first module having a transmitter portion 10'''. Elements corresponding to those in FIG. 1 use corresponding reference numerals. This arrangement differs from that of FIG. 1 in that the source, detector, microlens, and minilens arrays are all disposed parallel to a backplane structure 80. The figure also shows the first module as having a receiver portion for receiving downstream communications from an upstream module (not shown), and the second module as having a transmitter portion for transmitting downstream communications to a downstream module (not shown).

Backplane structure 80 has a profile in the form of a truncated sawtooth with flat peaks and valleys separated by inclined ramps. The surface of each peak is formed with a recessed keyway that mates with a corresponding protruding key on the bottom of the module to register the module. The inclined ramps are inclined at 45° angles to relay the light from one module to the other. The inclined reflective surfaces can be implemented by machining and polishing the surfaces of the backplane structure, which may be aluminum. Alternatively, the reflective surfaces can be implemented by using the backplane structure to support commercially available mirrors. The configuration of FIG. 8 can be extended to support upstream communications in the same way discussed above in connection with the system of FIG. 6, which extends the system of FIG. 1.

Figure 9:
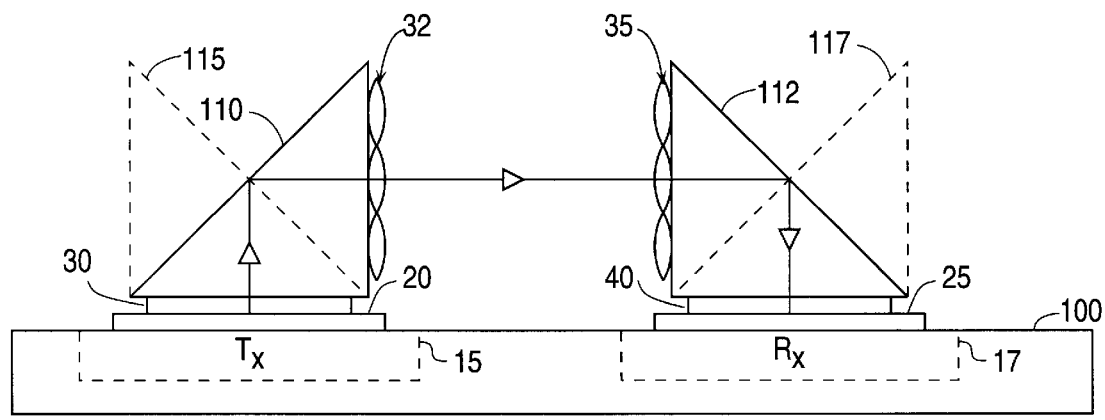
FIG. 9 is a simplified side view showing the spatially varying microlens array in an optical interconnection having an active backplane.

FIG. 9 is a simplified side view showing a system having an active backplane 100. Again, elements corresponding to those in FIG. 1 use corresponding reference numerals. This arrangement differs in that transmitter and receiver blocks 15 and 17 are integrated into backplane 100. Source and detector arrays 20 and 25 can be connected to the transmitter and receiver blocks in the same way as in the system of FIG. 1. The optical relay elements of this system include microlens array 30, first and second minilens arrays 32 and 35, and optional microlens array 40. The path is folded by two prisms 110 and 112 rather than four prisms as in the system of FIG. 1.

Two additional prisms 115 and 117 are shown in phantom, and would be deployed in order to support communication with upstream and downstream blocks. This system can also be extended to provide bidirectional communication by juxtaposing source and detector arrays as described above.

Specific Physical Implementations

As mentioned above, the source and detector device arrays may be bonded to a silicon CMOS substrate that contains the drive circuitry for the transmitter and receiver arrays. In some implementations, the minilenses will typically have respective diameters on the order of 5 mm diameter and respective focal lengths on the order of 20 mm. In some implementations, the microlenses will typically have center-to-center spacings on the order of 125 $\mu$m and focal lengths on the order of 260 $\mu$m (varying over a range in some embodiments).

In developing optimum optical configurations, it is possible to simulate the source and detector arrays with a custom reflective and transmissive mask to simulate the device windows as would be obtained with the real devices. These would then be used with optical fibers to input and output the optical signals so that the performance of the modules could be evaluated.

For testing and evaluation purposes it is sometimes useful to fabricate prototype versions of the optical components on thin (~1–2 mm) substrates, even if the ultimate embodiment uses thick substrates. For example, in the system of FIG. 1, it is possible to bond the arrays to the prisms, but for large production runs, a monolithic approach is preferred. In either instance, master elements are fabricated, and replicas made from them.

For the microlens arrays, the master tooling may be patterned using an x-y laser pattern generator (LPG), which exposes photoresist-coated substrates in a point-by-point process to a focused sub-micron spot HeCd laser beam ($\lambda$=0.4416 $\mu$m). The exposure dosage is varied on a point-by-point basis and the photoresist is processed for low contrast such that the relief profile after aqueous development is continuous. This manufacturing process allows for smooth, deep-sag microlenses to be achieved, while simultaneously having the ability to pattern diffractive or alignment features that require sharp profiles. The gradient focal length of the microlens array can be achieved by loading the control software of the LPG with the appropriate bitmap that defines the shape of each microlens in the array. The sag of the microlenses is anticipated to be in the 13 to 15 $\mu$m range. Once the photoresist is patterned, a rigid master for replication can be made by etch-transferring (through the use of a reactive ion etcher) the resist profile into the underlying substrate, or by electroplating.

The minilens array can be initially fabricated through the use of single-point diamond turning (SPDT). Due to the 5-mm clear aperture and focal length on the order of 20 mm, the sag of the minilens is estimated to be 310 $\mu$m, a depth which is generally too large for the LPG process. Since there are typically a small number of lenses in the minilens array (say 4 to 10), it appears feasible to use a precision mechanical fixture that will enable the SPDT machine to turn each minilens separately. The center-to-center registration of each minilens is anticipated to be better than 10 $\mu$m. The diamond-turning manufacturing technique allows a metal plug to be fabricated directly, and then subsequently used as a master for replication.

During the initial phase of the manufacturing effort, a cast-and-cure process can be used to produce replicated interconnect elements. In the cast-and-cure method, a thin polymer layer is added to a glass or bulk plastic substrate through the use of a suitable master and release agents. The polymer layer can be made such that its thickness is only 1–2 $\mu$m thicker than the total sag of the microstructure being replicated. Injection molding is preferred for larger production runs of these interconnection elements. Injection molding allows for very high volumes of these optical interconnects to be produced at low cost, but inevitably presents manufacturing and environmental issues such as polymer shrinkage, thermal coefficients of expansion, and glass transition temperatures. Dealing with these issues is generally within the skill of the art It is also desired to implement similar features onto thick substrates. The mastering techniques used for the thick-substrate interconnects are typically identical to those of the thin-substrate interconnects: SPDT can be used for the minilens arrays, the LPG process can be used for the microlens arrays, and the replication process used initially can be the cast-and-cure process. In the cast-and-cure process, the microlens array pattern is replicated on one side of a glass block or prism, and the minilens array pattern is replicated another side of the block or prism. The array-to-array alignment tolerance is likely to be as much as ±25 $\mu$m, which can be achieved mechanically. Tighter tolerances could require optical alignment techniques.

Injection molding of the thick-substrate interconnects, where thicknesses are on the order of 30 mm sides, presents greater manufacturing challenges. Injection mold inserts can be fabricated for both sides of the cavity, but the primary issue is likely to be the amount of shrinkage or sink that the part will experience after being molded. The gate and vent geometries of the cavity can be tailored to minimize the sink effect, but most likely the effect cannot be eliminated. Reducing cycle times such that the material is allowed to cool at a slower rate will help. One approach is to fabricate mold inserts that precompensate for the thermal shrinkage, which implies putting microlenses onto curved surfaces. This is a possibility for the diamond-turned minilens array insert, as well as for the microlens element, through the use of a conformal LPG.

Graded Focus Microlens Array

Figure 10:
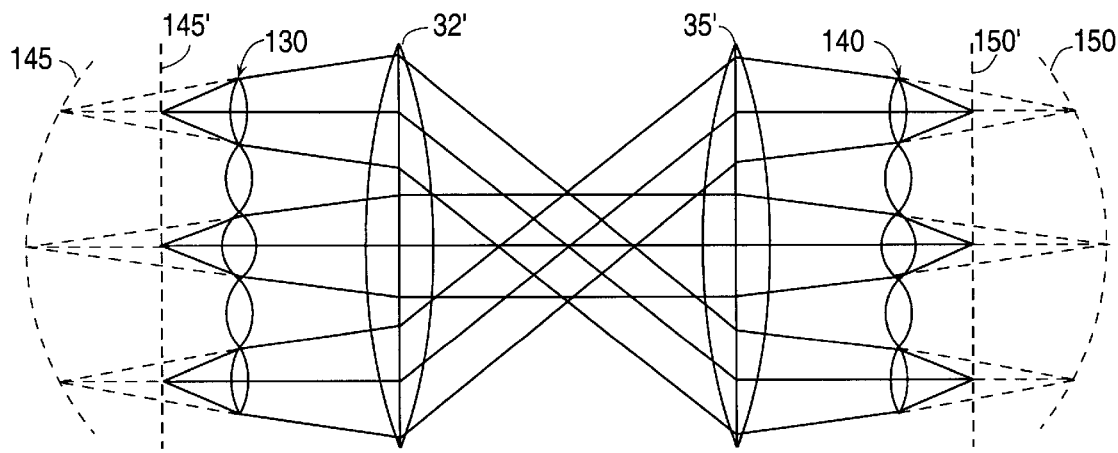
FIG. 10 shows schematically how the use of spatially varying microlens arrays corrects for field (Petzval) curvature of one of the minilenses.

FIG. 10 shows schematically how the invention's use of spatially varying microlens arrays corrects for field (Petzval) curvature of the minilenses. As alluded to above, in some embodiments it is desired to configure the microlens array so as to compensate for field curvature of the minilenses. This is accomplished by having the focal length of the microlenses vary with spatial position to correct field curvature.

The figure shows two minilenses 32' and 35', which correspond to single elements of minilens arrays 32 and 35 in other figures, while the microlens clusters that are associated with the minilenses are denoted 130 and 140. In the absence of the microlens arrays, light emitted from points in a curved object plane 145 is imaged at respective points in a curved image plane 150. The dashed ray lines, plus the solid ray lines between microlens clusters 130 and 140 represent the relay characteristics of two minilenses.

Correction of field curvature in single-element lenses is generally difficult. However, by making the focal lengths of the microlenses at the center of the array shorter than those towards the outside of the array, it is possible to correct for the field curvature of the minilenses. This is shown schematically in the drawing as thicker microlenses closer to the minilens axis. In general, the effect of the microlens arrays is to bring the object and image planes closer. However, if the microlenses were not configured with spatially varying focal lengths, the object and image planes would still be curved. As shown schematically, the microlenses are configured with spatially varying focal lengths to result in a flat object plane 145' and a flat image plane 150'.

Figure 11:
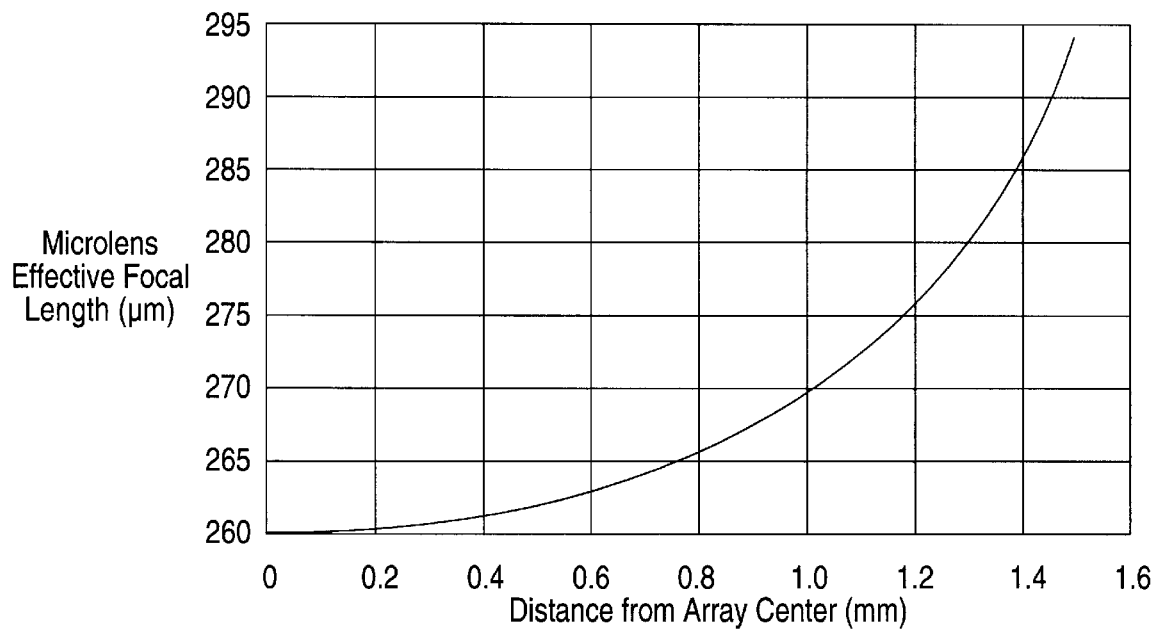
FIG. 11 shows a graph of microlens focal length as a function of distance from the center of the microlens cluster used to correct field curvature of the minilens relay.

FIG. 11 shows a graph of microlens focal length as a function of distance from the center of the cluster used to correct Petzval curvature of the minilens relay. We modeled the effects of the Petzval curvature of a 20-mm effective focal length minilens relay, used with a 0.178 numerical aperture input and output beam to evaluate the range of microlens focal lengths required across the microlens array.

As can be seen, the focal length ranges from 260 μm at the center element to 290 μm for elements 1.4 mm off axis. The graph clearly shows a rapid increase for field positions greater than 1.4 mm, consistent with the fact that the spherical Petzval field curves towards infinity (in the longitudinal direction) at distances from the axis corresponding to the radius of curvature of the field itself. Thus the available array size is still limited by the Petzval curvature of the minilenses but is significantly increased when using the microlens array with the spatially varying focal length.

Figure 12:
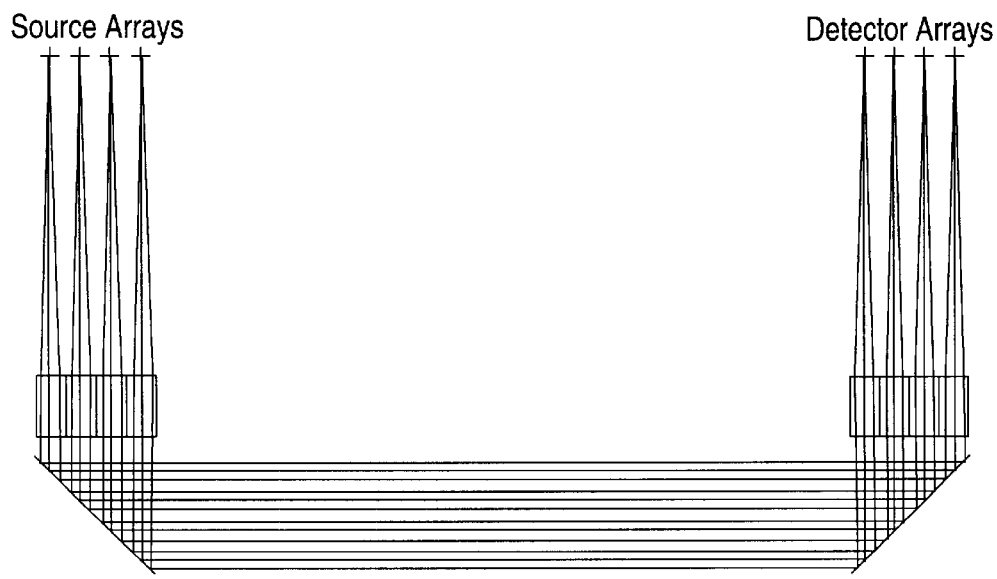
FIG. 12 shows a ray trace developed in modeling the relay optics.

FIG. 12 shows a ray trace modeled using Oslo optical design software for the central microlens of each of four clusters corresponding to each of four minilenses. The microlenses were set to the same focal length. This relays the optical data from the sources at the upper left to the receivers at the upper right. We modeled and ray traced different optical systems for different board spacings and parameters of the optoelectronic arrays. This particular design has a 19.0-mm effective focal length and a 5-mm aperture for the minilenses, and a 260 -μm effective focal length and 125 -μm aperture for the microlenses. This means that the minilens and microlens are used at f/12.6 and f/6.25 with beam diameters of 1.5 mm and 40 μm, respectively.

This system, in combination with the invention's graded focus microlens arrays, is capable of providing an interconnect density of 1600 interconnects/cm2, with a total optical I/O of 3200 per module, interconnecting boards spaced at a distance of 8 cm. The microlenses are preferably in a square packing geometry, but the clear aperture of the entire array will be hexagonal (see rightmost portion of FIG. 2) in order to maximize optical throughput of the system and to match the transmitter and receiver array configurations. Use of the spatially varying microlens to correct field curvature makes it possible to obtain a high interconnect density of 1600/cm2 and to provide an optical system with large enough capacity per minilens channel to accommodate 400-element patches.

Other Applications for a Microlens Array with a Spatially Varying Optical Property In addition to the optical bus interconnect system described in detail above, there are other applications for a microlens array where an optical property (focal length or shape, for example) varies with respect to the location in the array. Examples include directional radiometers, electronic cameras, video camera lenses, zoom lenses for electronic or video cameras, sampling contact microscope/scanner objectives, pixel projection systems (LCD, DMD, VCSEL—with and without zoom lens), optical bus interconnects, infrared imaging systems. As mentioned above, other variations with location can be used to correct other aberrations such as astigmatism (for example, using toroidal microlenses).

Figure 13:
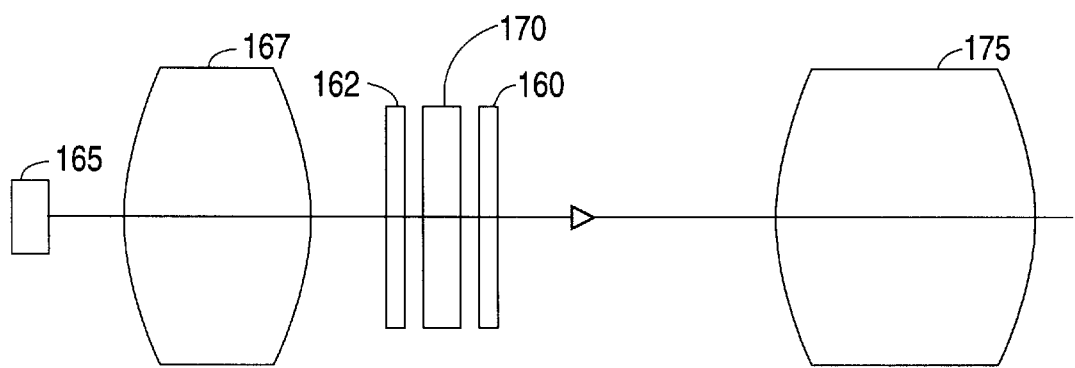
FIG. 13 shows the use of the spatially varying microlens array in an LCD projection system.

FIG. 13 shows the use of spatially varying microlens arrays 160 and 162 in an LCD projection system. The additional elements of the projection system includes, in light path order, a light source 165, condensing optics 167, a pixellated transmissive LCD array 170, and projection optics 175. Microlens array 160 is disposed on the downstream side of the LCD array (i.e., in the imaging path) while microlens array is disposed on the upstream side of the LCD array (i.e., in the illumination path). The condensing optics and projection optics are shown schematically as thick lenses, signifying multi-element lenses, but could include reflective elements in addition to, or instead of, refracting elements. The use of the variable focal length microlens array eliminates the need for a field flattener (negative lens near the LCD display). A gradifocus lens may or may not be used on the condensor side of the array depending upon the illumination system. If a large uniform light source is used then it would generally not be needed. If a bright, focused light source is used then some variation in the microlenses performance could be used to correct for uniformity variations in the condenser optics. This could include variations in aperture, focal length, and/or astigmatism (toroid) depending upon the design of the projector optics.

Figure 14:
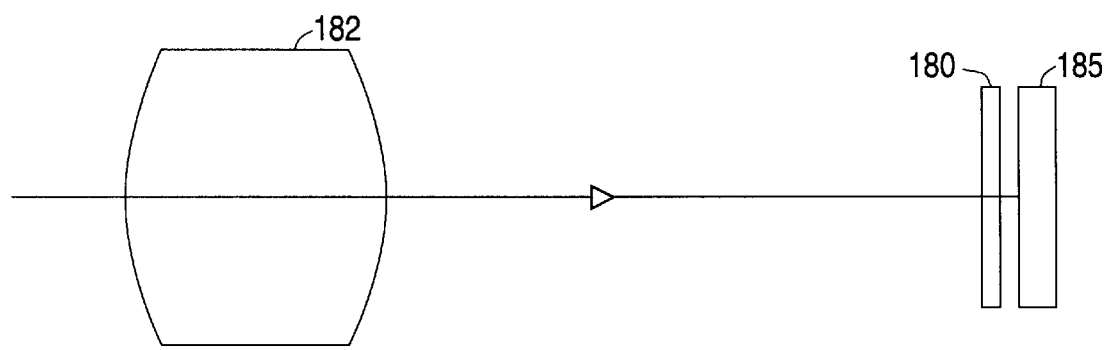
FIG. 14 shows the use of the spatially varying microlens array in a digital camera.

FIG. 14 shows the use of a spatially varying microlens array 180 in a digital camera system. The additional optical elements include an objective lens and a pixellated sensor (e.g., a CCD or CMOS sensor array).

Conclusion

While the above is a complete description of specific embodiments of the invention, various modifications, alternative constructions, and equivalents may be used. For example, in applications showing the use of two microlens arrays, there is no requirement that both be identically configured or that both are characterized by spatial variation of the same optical property. Indeed, in some applications, one of the two microlens arrays can be uniform. Therefore, the above description should not be taken as limiting the scope of the invention as defined by the claims.

What is claimed is:

1. An array of microlenses used in an optical system for imaging an array of light sources, the optical system including a relay lens system having field curvature, wherein:

the array of microlenses is disposed to intercept light from the relay lens system;

each microlens is characterized by a focal length; and the focal length of a first microlens differs from the focal length of the second microlens as a function of the distance from the center of the microlens array so as to reduce the field curvature of the optical system.

2. An array of microlenses used in a projection system, the projection system including a transmissive array and a projection lens system having field curvature, wherein:

the array of microlenses is disposed between the transmissive array and the projection lens system;

each microlens is characterized by a focal length; and the focal length of a first microlens differs from the focal length of the second microlens as a function of the distance from the center of the microlens array so as to reduce the field curvature of the projection system.

3. An array of microlenses used in a camera system, the camera system including a detector array and an objective lens system having field curvature, wherein:

the array of microlenses is disposed between the objective lens system and the detector array;

each microlens is characterized by a focal length; and the focal length of a first microlens differs from the focal length of the second microlens as a function of the distance from the center of the microlens array so as to reduce the field curvature of the camera system.

4. An array of microlenses for use in combination with a relay lens having field curvature tending to cause curvature of an image surface, wherein the focal lengths of the microlenses in the array vary with spatial position in a manner so as to reduce the curvature of the image surface.

5. An optical system that incorporates first and second of the array of microlenses of claim 4 on each side of the relay lens.

* * * * *